(12) United States Patent
Obayashi et al.

(10) Patent No.: US 7,863,216 B2
(45) Date of Patent: Jan. 4, 2011

(54) DISCHARGE GAS TREATMENT CATALYST

(75) Inventors: Yoshiaki Obayashi, Hiroshima (JP); Toshiyuki Onishi, Nagasaki (JP); Kozo Iida, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1098 days.

(21) Appl. No.: 11/231,861

(22) Filed: Sep. 22, 2005

(65) Prior Publication Data

US 2006/0083671 A1 Apr. 20, 2006

(30) Foreign Application Priority Data

Oct. 14, 2004 (JP) .............................. 2004-299679
Jun. 28, 2005 (JP) .............................. 2005-188060

(51) Int. Cl.
B01J 23/00 (2006.01)
B01J 21/00 (2006.01)
B01J 20/00 (2006.01)

(52) U.S. Cl. ................ 502/261; 502/242; 502/254; 502/309; 502/313; 502/326; 502/350; 502/407; 502/439

(58) Field of Classification Search .............. 502/242, 502/254, 261, 309, 313, 314, 326, 350
See application file for complete search history.

(56) References Cited

U.S. PATENT DOCUMENTS

| | | | | |
|---|---|---|---|---|
| 4,350,613 A * | 9/1982 | Nishino et al. | ............... | 502/200 |
| 5,272,125 A * | 12/1993 | Weible et al. | ............... | 502/242 |
| 6,117,814 A * | 9/2000 | Plecha et al. | ............... | 502/325 |
| 6,124,367 A * | 9/2000 | Plecha et al. | ............... | 518/715 |
| 6,403,844 B1 * | 6/2002 | Zhang et al. | ............... | 568/864 |
| 6,444,608 B1 * | 9/2002 | Oki et al. | ............... | 502/300 |
| 6,613,299 B2 * | 9/2003 | Dang et al. | ............... | 423/239.1 |
| 6,977,237 B2 * | 12/2005 | Geerlings et al. | ............... | 502/326 |
| 7,125,822 B2 * | 10/2006 | Nakano et al. | ............... | 502/339 |
| 7,138,358 B2 * | 11/2006 | Huang et al. | ............... | 502/326 |
| 7,179,442 B2 * | 2/2007 | Hagemeyer et al. | ........ | 423/655 |
| 7,211,540 B2 * | 5/2007 | Nakanishi | ............... | 502/309 |
| 7,348,293 B2 * | 3/2008 | Timken | ............... | 502/327 |
| 7,393,809 B2 * | 7/2008 | Kim | ............... | 502/326 |
| 7,538,064 B2 * | 5/2009 | Gillespie et al. | ............... | 502/208 |
| 7,541,012 B2 * | 6/2009 | Yeung et al. | ............... | 423/245.1 |
| 7,541,310 B2 * | 6/2009 | Espinoza et al. | ............... | 502/326 |
| 7,618,917 B2 * | 11/2009 | Vanoppen et al. | ............... | 502/326 |
| 2002/0131915 A1 * | 9/2002 | Shore et al. | ............... | 422/177 |
| 2002/0147103 A1 * | 10/2002 | Ruettinger et al. | ............... | 502/66 |
| 2003/0166951 A1 * | 9/2003 | Blankenstein et al. | ....... | 549/529 |
| 2004/0097371 A1 * | 5/2004 | Jangbarwala | ............... | 502/439 |
| 2004/0176619 A1 * | 9/2004 | Vanoppen et al. | ............. | 549/533 |
| 2005/0032637 A1 * | 2/2005 | Kim | ............... | 502/216 |

* cited by examiner

*Primary Examiner*—Cam N Nguyen
(74) *Attorney, Agent, or Firm*—Kanesaka Berner & Partners

(57) ABSTRACT

The invention provides a discharge gas treatment catalyst which can effectively decreases $NO_x$ and $SO_3$ contained in a discharge gas. The discharge gas treatment catalyst, for removing nitrogen oxide and sulfur trioxide from a discharge gas, includes a carrier which is formed of titania-tungsten oxide and which carries ruthenium, and a titania-tungsten oxide-based $NO_x$ removal catalyst serving as a substrate which is coated with the carrier. When a discharge gas to which ammonia has been added and which contains $SO_3$ and $NO_x$ is brought into contact with the catalyst, decomposition of ammonia is suppressed by ruthenium, and reduction of $SO_3$ and $NO_x$ contained in the discharge gas is promoted, whereby $SO_3$ concentration and $NO_x$ concentration can be further decreased.

4 Claims, 1 Drawing Sheet

DISCHARGE GAS TREATMENT CATALYST

BACKGROUND OF THE INVENTION

1. Field of the Invention

The present invention relates to a discharge gas treatment catalyst for use in removal of nitrogen oxide ($NO_x$) and sulfur trioxide ($SO_3$) from a gas discharged by a boiler or a similar apparatus.

2. Background Art

In order to remove nitrogen oxide ($NO_x$) from contained in a discharge gas produced from a boiler, a gas turbine, a combustion furnace, etc., in practice, there has currently been employed an ammonia catalytic reduction method in which $NO_x$ is decomposed by use of ammonia ($NH_3$), serving as a reducing agent, in the presence of a nitrogen oxide removal catalyst (hereinafter abbreviated as "an $NO_x$ removal catalyst"), to thereby form nontoxic nitrogen and water.

In many cases, boilers and similar apparatuses employ coal or fuel oil C, having a high sulfur content, as fuel. When such fuel is burnt, the discharge gas contains sulfur dioxide ($SO_2$) at high concentration and sulfur trioxide ($SO_3$). During treatment of the discharge gas, two reactions occur in parallel; i.e., $NO_x$ reduction for removal thereof and oxidation of $SO_2$ to form sulfur trioxide ($SO_3$). As a result, the discharge gas comes to have increased $SO_3$ content. The thus-formed $SO_3$ and remaining $NH_3$, which has not reacted in the $NO_x$ reduction for removal thereof, are readily combined together at low temperature, thereby forming compounds such as acidic ammonium sulfate. These compounds, including acidic ammonium sulfate as well as $SO_3$, corrode piping and the interior of an apparatus such as a heat exchanger disposed on the downstream side of the discharge gas treatment system. The corrosion causes plugging, partial clogging, etc., increasing pressure loss. Thus, in order to prevent pressure loss, countermeasures such as performance enhancement of a dust collector must be taken.

Japanese Patent Application Laid-Open (kokai) Nos. 10-249163 and 11-267459 disclose $NO_x$ removal catalysts formed of oxides (e.g., tungsten oxide and vanadium oxide-tungsten oxide) carried by titania, which catalysts exhibit excellent $NO_x$ removal performance and low $SO_2$ oxidation performance (i.e., preventing oxidation of $SO_2$ to $SO_3$).

However, when the aforementioned catalysts are employed, about 0.1% of $SO_2$ is oxidized to $SO_3$. Thus, demand exists for complete suppression of oxidation of $SO_2$ to $SO_3$ occurring simultaneously with $NO_x$ removal reaction, and reduction of $SO_3$ level of a discharge gas, and, for example, Japanese Patent Application Laid-Open (kokai) Nos. 10-249163 and 11-267459 disclose a variety of techniques to satisfy the demand. However, there have further been demanded effective reduction of $SO_3$ and $NO_x$ contained in a discharge gas as well as further prevention of $SO_3$ formation which would undesirably occur in catalytic reaction.

SUMMARY OF THE INVENTION

The present invention has been made under such circumstances, and an object of the present invention is to provide a discharge gas treatment catalyst which further prevents $SO_3$ formation occurring in catalytic reaction and which effectively decreases $NO_x$ and $SO_3$, which co-exists with $NO_x$ in a discharge gas and which serves as a source for an S-containing substance such as acidic ammonium sulfate causing lowered catalyst performance and corrosion of an apparatus disposed on the downstream side of a treatment system containing the catalyst. Another object is to provide a discharge gas treatment method employing the catalyst. Still another object of the invention is to provide a discharge gas treatment apparatus employing the catalyst.

Accordingly, in a first aspect of the present invention, there is provided a discharge gas treatment catalyst for removing nitrogen oxide and sulfur trioxide from a discharge gas, comprising a carrier which is formed of titania-tungsten oxide, titania-silica, or titania-silica-tungsten oxide and which carries ruthenium; and a substrate which is coated with the carrier carrying ruthenium.

Preferably, when the carrier is titania-tungsten oxide, the substrate is formed of a titania-tungsten oxide-based $NO_x$ removal catalyst, and when the carrier is titania-silica or titania-silica-tungsten oxide, the substrate is formed of a titania-based or a titania-tungsten oxide-based $NO_x$ removal catalyst.

Preferably, when the carrier is titania-tungsten oxide, the carrier contains tungsten oxide in an amount of 0.1 to 25 parts by weight on the basis of 100 parts by weight of titania contained in the carrier.

Preferably, when the carrier is titania-silica or titania-silica-tungsten oxide, the carrier has a solid acid content of 0.3 mmol/g or higher.

Preferably, the catalyst contains ruthenium in an amount of 0.02 to 10 parts by weight on the basis of 100 parts by weight of the carrier.

Preferably, the substrate contains tungsten oxide in an amount of 0.1 to 25 parts by weight on the basis of 100 parts by weight of titania contained in the substrate.

In a second aspect of the present invention, there is provided a discharge gas treatment method for removing nitrogen oxide and sulfur trioxide from a discharge gas, the method comprising adding ammonia to the discharge gas; and bringing the discharge gas containing ammonia into contact with the aforementioned discharge gas treatment catalyst, whereby sulfur trioxide and nitrogen oxide are reduced.

In a third aspect of the present invention, there is provided a discharge gas treatment apparatus for removing nitrogen oxide and sulfur trioxide from a discharge gas, the apparatus comprising the aforementioned discharge gas treatment catalyst, the catalyst being disposed so as to be exposed to the discharge gas to which ammonia has been added, whereby sulfur trioxide and nitrogen oxide are reduced in the presence of the discharge gas treatment catalyst.

Preferably, the discharge gas treatment apparatus further comprises an $NO_x$ removal catalyst being disposed on the downstream side of the discharge gas treatment catalyst, whereby nitrogen oxide is further reduced in the presence of the $NO_x$ removal catalyst.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Figure 1:
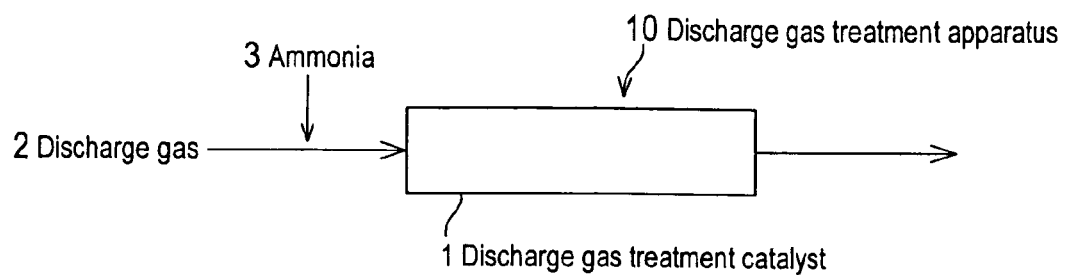
FIG. 1 a schematic representation of a discharge gas treatment apparatus according to one embodiment of the present invention.

Next will be described best modes of carrying out the invention including the discharge gas treatment catalyst and the discharge gas treatment method employing the catalyst.

In one embodiment, the discharge gas treatment catalyst of the present invention is used for simultaneously removing $SO_3$ (see Scheme (1)) and $NO_x$ (see Schemes (3) and (4)) from a discharge gas which has been produced from a boiler, a gas turbine, a combustion furnace, etc. and which contains sulfur oxide ($SO_x$) and nitrogen ($NO_x$), through addition of ammonia serving as a reducing agent. In the embodiment, the employed discharge gas treatment catalyst includes a carrier which is formed of titania-tungsten oxide, titania-silica, or titania-silica-tungsten oxide and which carries ruthenium; and a substrate which is formed of a titania-based or titania-tungsten oxide-based $NO_x$ removal catalyst and which coated with the carrier. Therefore, ruthenium carried by the carrier is appropriately distributed on the surface of the substrate, and oxidation of $SO_2$ to $SO_3$ (see Scheme (2)) in the discharge gas is prevented, thereby promoting reduction of $SO_3$ to $SO_2$ and reduction of nitrogen oxides contained in the discharge gas. As a result, concentrations of sulfur trioxide and nitrogen oxides contained in the discharge gas can be decreased.

  (1)

  (2)

  (3)

  (4)

The titania-tungsten oxide carrier is formed of 100 parts by weight of titania and 0.1 to 25 parts by weight (unless otherwise specified, "part(s)" is on the weight basis) of tungsten oxide. The catalytic activity can be attained, when the ruthenium, serving as an active metal, is carried in an amount of 0.02 to 10 parts on the basis of 100 parts of the carrier. When the amount of ruthenium is 0.1 to 4 parts on the basis of 100 parts of the carrier, the catalytic activity becomes higher. In the case where the tungsten oxide content falls within the above range and a discharge gas is brought into contact with the substrate, reduction of sulfur trioxide and nitrogen oxides contained in the discharge gas can be further promoted. Thus, concentrations of sulfur trioxide and nitrogen oxides contained in the discharge gas can be further decreased.

The titania-silica carrier or the titania-silica-tungsten oxide carrier has a solid acid content, as determined through temperature programmed desorption of pyridine, of 0.3 mmol/g or higher. Since the titania-silica carrier or the titania-silica-tungsten oxide carrier has a solid acid content falling within the above range, the carrier strongly adsorbs ammonia contained in the discharge gas, thereby further promoting reduction of sulfur trioxide and nitrogen oxides contained in the discharge gas. Thus, concentrations of sulfur trioxide and nitrogen oxides contained in the discharge gas can be further decreased. No particular limitation is imposed on the method of causing ruthenium to be carried by the carrier. In the case where the titania-tungsten oxide carrier, the titania-silica carrier, or the titania-silica-tungsten oxide carrier is in the form of powder, the spray drying method may be employed. When the carrier is a honeycomb product or grains, the impregnation method may be employed.

The titania-tungsten oxide-based $NO_x$ removal catalyst serving as a substrate is formed of 100 parts of titania and 0.1 to 25 parts of tungsten oxide. When the tungsten oxide content of the substrate falls within the above range and a discharge gas is brought into contact with the substrate, reduction of sulfur trioxide and nitrogen oxides contained in the discharge gas can be further promoted. Thus, concentrations of sulfur trioxide and nitrogen oxides contained in the discharge gas can be further decreased.

Figure 2:
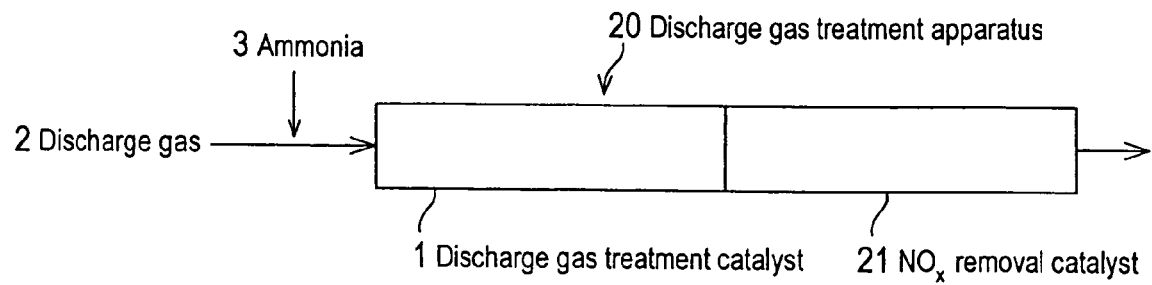
FIG. 2 a schematic representation of a discharge gas treatment apparatus according to another embodiment of the present invention.

Embodiments of the discharge gas treatment apparatus according to the present invention include a discharge gas treatment apparatus 10 as shown in FIG. 1, and a discharge gas treatment apparatus 20 as shown in FIG. 2. The discharge gas treatment apparatus 10 includes only the aforementioned discharge gas treatment catalyst 1, and the discharge gas treatment apparatus 20 has the aforementioned discharge gas treatment catalyst 1, and an $NO_x$ removal catalyst 21 connected to the catalyst 1 in series. Ammonia 3 is added to a discharge gas 2 to be fed to the discharge gas treatment apparatus 10 or 20. In the discharge gas treatment apparatus 20, the discharge gas treatment catalyst 1 is disposed so as to be exposed to the discharge gas 2 containing ammonia 3, and the $NO_x$ removal catalyst 21 is disposed on the downstream side of the discharge gas treatment catalyst. Any of conventionally employed catalysts may serve as the $NO_x$ removal catalyst 21. By feeding the discharge gas 2 containing ammonia 3 to the discharge gas treatment apparatus 10 or 20, oxidation of $SO_2$ contained in the discharge gas to $SO_3$ can be prevented, and reduction of $SO_3$ contained in the discharge gas to $SO_2$ and $NO_x$ removal are simultaneously performed. Specifically, in the presence of the discharge gas treatment catalyst 1, $SO_3$ contained in the discharge gas is reduced to form $SO_2$, and $NO_x$ is reduced to form nitrogen. Through passage of the discharge gas on the $NO_x$ removal catalyst 21, $NO_x$ remaining in the discharge gas is further reduced to form nitrogen.

Through use of a single discharge gas treatment apparatus 10 or 20, the sulfur trioxide concentration and the nitrogen oxide concentration of the discharge gas can be sufficiently decreased. Therefore, the scale and cost of the discharge gas treatment apparatuses 10 and 20 can be reduced.

EXAMPLES

Example 1

Catalyst Preparation Method 1

A honeycomb-form catalyst (hereinafter referred to simply as honeycomb catalyst) formed of 100 parts by weight of titania ($TiO_2$) and 9 parts of tungsten oxide ($WO_3$) ($TiO_2$—$WO_3$ honeycomb catalyst) was immersed in a ruthenium chloride ($RuCl_3$) solution (Ru concentration: 40 g/L) for one minute. Through impregnation caused by immersion, Ru (1 part) was carried by the titania-tungsten oxide catalyst (100 parts). The concentration of ruthenium chloride solution so that ruthenium (1 part) is carried by a honeycomb substrate (100 parts), when the titania-tungsten oxide honeycomb catalyst has a water content of 0.25 mL per 1 g of the catalyst, is calculated as follows.

$$0.01 \times (1/0.25) = 0.04 \text{ g/mL}$$

$$= 40 \text{ g/L}$$

Thus, when a honeycomb catalyst (100 parts) is immersed for one minute in a ruthenium chloride ($RuCl_3$) solution having an Ru concentration of 40 g/L, the honeycomb catalyst (100 parts) is impregnated with ruthenium (1 part).

The titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (No. 1) for catalyst coating.

A titania-tungsten oxide honeycomb catalyst (pitch: 7.4 mm, wall thickness: 1.15 mm) (i.e., titania-tungsten oxide-based $NO_x$ removal catalyst) serving as a substrate was immersed in the above slurry (No. 1), whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 1).

Example 2

Catalyst Preparation Method 2

The same slurry (No. 1) for catalyst coating as prepared in Catalyst preparation method 1 and the same honeycomb catalyst serving as a substrate as employed in Catalyst preparation method 1 were used. The set of immersion of the substrate in the slurry (No. 1), drying the substrate immersed in the slurry, and firing the dried substrate was performed twice, whereby the slurry (No. 1) was applied to the surface of the substrate at 200 g/$m^2$. The thus-prepared honeycomb catalyst was employed as a discharge gas treatment catalyst (No. 2).

Example 3

Catalyst Preparation Method 3

A honeycomb catalyst formed of 100 parts of titania ($TiO_2$) and 20 parts of tungsten oxide ($WO_3$) was immersed in a ruthenium chloride ($RuCl_3$) solution. Through impregnation caused by immersion, Ru (1 part) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (No. 3) for catalyst coating.

In a manner similar to that employed in Catalyst preparation method 1, a honeycomb catalyst was produced, to thereby provide a discharge gas treatment catalyst (No. 3).

Example 4

Catalyst Preparation Method 4

A honeycomb catalyst formed of 100 parts of titania ($TiO_2$) and 9 parts of tungsten oxide ($WO_3$) was immersed in a ruthenium chloride ($RuCl_3$) solution. Through impregnation caused by immersion, Ru (2 parts) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (No. 4) for catalyst coating.

In a manner similar to that employed in Catalyst preparation method 1, a honeycomb catalyst was produced, to thereby provide a discharge gas treatment catalyst (No. 4).

Example 5

Catalyst Preparation Method 5

An anatase-form titania powder formed of 100 parts of titania ($TiO_2$) and 9 parts of tungsten oxide ($WO_3$) was mixed with a ruthenium chloride ($RuCl_3$) solution, to thereby prepare a slurry. Through spray drying of the slurry, Ru (1 part) was carried by the anatase-form titania powder (100 parts). Subsequently, the titania powder was fired at 500° C. for five hours.

The thus-formed titania-tungsten oxide-ruthenium catalyst powder was mixed with water and pulverized by use of a wet ball mill, to thereby prepare a slurry (No. 5) for catalyst coating.

In a manner similar to that employed in Catalyst preparation method 1, a honeycomb catalyst was produced, to thereby provide a discharge gas treatment catalyst (No. 5).

Example 6

Catalyst Preparation Method 6

A honeycomb catalyst formed of 100 parts of titania ($TiO_2$) and 9 parts of tungsten oxide ($WO_3$) was immersed in a ruthenium chloride ($RuCl_3$) solution. Through impregnation caused by immersion, Ru (0.1 part) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (No. 6) for catalyst coating.

In a manner similar to that employed in Catalyst preparation method 1, a honeycomb catalyst was produced, to thereby provide a discharge gas treatment catalyst (No. 6).

Example 7

Catalyst Preparation Method 7

A honeycomb catalyst formed of 100 parts of titania ($TiO_2$) and 9 parts of tungsten oxide ($WO_3$) was immersed in a ruthenium chloride ($RuCl_3$) solution. Through impregnation caused by immersion, Ru (0.5 parts) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (No. 7) for catalyst coating.

In a manner similar to that employed in Catalyst preparation method 1, a honeycomb catalyst was produced, to thereby provide a discharge gas treatment catalyst (No. 7).

Example 8

Catalyst Preparation Method 8

An anatase-form titania powder formed of 100 parts of titania ($TiO_2$) and 9 parts of tungsten oxide ($WO_3$) was mixed with a ruthenium chloride ($RuCl_3$) solution, to thereby prepare a slurry. Through spray drying of the slurry, Ru (4 parts) was carried by the anatase-form titania powder (100 parts). Subsequently, the titania powder was fired at 500° C. for five hours.

The thus-formed titania-tungsten oxide-ruthenium catalyst powder was mixed with water and pulverized by use of a wet ball mill, to thereby prepare a slurry (No. 8) for catalyst coating.

In a manner similar to that employed in Catalyst preparation method 1, a honeycomb catalyst was produced, to thereby provide a discharge gas treatment catalyst (No. 8).

Example 9

Catalyst Preparation Method 9

An anatase-form titania powder formed of 100 parts of titania ($TiO_2$) and 9 parts of tungsten oxide ($WO_3$) was mixed with a ruthenium chloride ($RuCl_3$) solution, to thereby prepare a slurry. Through spray drying of the slurry, Ru (10 parts) was carried by the anatase-form titania powder (100 parts). Subsequently, the titania powder was fired at 500° C. for five hours.

The thus-formed titania-tungsten oxide-ruthenium catalyst powder was mixed with water and pulverized by use of a wet ball mill, to thereby prepare a slurry (No. 9) for catalyst coating.

In a manner similar to that employed in Catalyst preparation method 1, a honeycomb catalyst was produced, to thereby provide a discharge gas treatment catalyst (No. 9).

Example 10

Catalyst Preparation Method 10

A tetraisopropyl orthotitanate solution ($Ti(OiC_3H_7)_4$, product of Nippon Soda Co., Ltd.) (1,126 g) and a tetraethyl orthosilicate solution ($Si(OC_2H_5)_4$, product of Tama Chemical Co., Ltd.) (57.6 g) were mixed, and the mixture was added to hot water (80° C.) placed in a separate vessel. The mixture was stirred for two hours for hydrolyzing the $TiO_2$ source and the $SiO_2$ source, thereby yielding a slurry containing $TiO_2$—$SiO_2$ hydroxide. The slurry was filtered, dried, and fired at 500° C. for five hours, to thereby prepare a $TiO_2$—$SiO_2$ complex oxide powder (No. 1) formed of $TiO_2$ (95 parts) and $SiO_2$ (5 parts).

The complex oxide powder (No. 1) and a ruthenium chloride ($RuCl_3$) solution were mixed together, to thereby prepare a slurry. Through spray drying of the slurry, Ru (2 parts) was carried by the titania-silica powder (100 parts). Subsequently, the titania-silica powder was fired at 500° C. for five hours.

The thus-formed titania-silica-ruthenium catalyst powder was mixed with water and pulverized by use of a wet ball mill, to thereby prepare a slurry (No. 10) for catalyst coating.

A titania-tungsten oxide honeycomb catalyst (pitch: 7.4 mm, wall thickness: 1.15 mm) (i.e., titania-tungsten oxide-based $NO_x$ removal catalyst) serving as a substrate was immersed in the above slurry (No. 10), whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 10).

Example 11

Catalyst Preparation Method 11

A tetraisopropyl orthotitanate solution ($Ti(OiC_3H_7)_4$, product of Nippon Soda Co., Ltd.) (531.5 g) and a tetraethyl orthosilicate solution ($Si(OC_2H_5)_4$, product of Tama Chemical Co., Ltd.) (57.6 g) were mixed, and the mixture was added to hot water (80° C.) placed in a separate vessel. The mixture was stirred for two hours for hydrolyzing the $TiO_2$ source and the $SiO_2$ source, thereby yielding a slurry containing $TiO_2$—$SiO_2$ hydroxide. The slurry was filtered, dried, and fired at 500° C. for five hours, to thereby prepare a $TiO_2$—$SiO_2$ complex oxide powder (No. 2) formed of $TiO_2$ (90 parts) and $SiO_2$ (10 parts).

In a manner similar to that employed in Catalyst preparation method 10, a honeycomb catalyst was produced, to thereby provide a discharge gas treatment catalyst (No. 11).

Example 12

Catalyst Preparation Method 12

A tetraisopropyl orthotitanate solution ($Ti(OiC_3H_7)_4$, product of Nippon Soda Co., Ltd.) (236.2 g) and a tetraethyl orthosilicate solution ($Si(OC_2H_5)_4$, product of Tama Chemical Co., Ltd.) (57.6 g) were mixed, and the mixture was added to hot water (80° C.) placed in a separate vessel. The mixture was stirred for two hours for hydrolyzing the $TiO_2$ source and the $SiO_2$ source, thereby yielding a Slurry containing $TiO_2$—$SiO_2$ hydroxide. The slurry was filtered, dried, and fired at 500° C. for five hours, to thereby prepare a $TiO_2$—$SiO_2$ complex oxide powder (No. 3) formed of $TiO_2$ (80 parts) and $SiO_2$ (20 parts).

In a manner similar to that employed in Catalyst preparation method 10, a honeycomb catalyst was produced, to thereby provide a discharge gas treatment catalyst (No. 12).

Example 13

Catalyst Preparation Method 13

The $TiO_2$—$SiO_2$ complex oxide powder (No. 1) prepared through Catalyst preparation method 10 and formed of $TiO_2$ (95 parts) and $SiO_2$ (5 parts) was mixed with a ruthenium chloride ($RuCl_3$) solution, to thereby prepare a slurry. Through spray drying of the slurry, Ru (4 parts) was carried by the titania-silica powder (100 parts). Subsequently, the titania-silica powder was fired at 500° C. for five hours.

The thus-formed titania-silica-ruthenium catalyst powder was mixed with water and pulverized by use of a wet ball mill, to thereby prepare a slurry (No. 13) for catalyst coating.

In a manner similar to that employed in Catalyst preparation method 10, a honeycomb catalyst was produced, to thereby provide a discharge gas treatment catalyst (No. 13).

Example 14

Catalyst Preparation Method 14

The $TiO_2$—$SiO_2$ complex oxide powder (No. 1) (1,000 g) prepared through Catalyst preparation method 10 and formed of $TiO_2$ (95 parts) and $SiO_2$ (5 parts) was mixed with a solution (1 L) of ammonium paratungstate $((NH_4)_{10}W_{12}O_{41} \cdot 5H_2O)$ (101.3 g) in 10% methylamine, followed by adding water (3 L) to the mixture, to thereby prepare a slurry. Through spray drying of the slurry, tungsten oxide ($WO_3$) (9 parts) was carried by the $TiO_2$—$SiO_2$ complex oxide powder (100 parts). Subsequently, the complex oxide powder was fired at 500° C. for five hours.

Subsequently, the above $TiO_2$—$SiO_2$—$WO_3$ powder was mixed with a ruthenium chloride ($RuCl_3$) solution, to thereby prepare a slurry. Through spray drying of the slurry, Ru (2 parts) was carried by the titania-silica-tungsten oxide powder (100 parts). Subsequently, the titania-silica-tungsten oxide powder was fired at 500° C. for five hours.

The thus-formed titania-silica-tungsten oxide-ruthenium catalyst powder was mixed with water and pulverized by use of a wet ball mill, to thereby prepare a slurry (No. 14) for catalyst coating.

In a manner similar to that employed in Catalyst preparation method 10, a honeycomb catalyst was produced, to thereby provide a discharge gas treatment catalyst (No. 14).

Example 15

Catalyst Preparation Method 15

A $TiO_2$—$SiO_2$—$WO_3$ powder formed of the $TiO_2$—$SiO_2$ complex oxide powder (100 parts) prepared through Catalyst preparation method 14 and tungsten oxide ($WO_3$) (9 parts) was mixed with a ruthenium chloride ($RuCl_3$) solution, to thereby prepare a slurry. Through spray drying of the slurry, Ru (4 parts) was carried by the titania-silica-tungsten oxide powder (100 parts). Subsequently, the titania-silica-tungsten oxide powder was fired at 500° C. for five hours.

The thus-formed titania-silica-tungsten oxide-ruthenium catalyst powder was mixed with water and pulverized by use of a wet ball mill, to thereby prepare a slurry (No. 15) for catalyst coating.

In a manner similar to that employed in Catalyst preparation method 10, a honeycomb catalyst was produced, to thereby provide a discharge gas treatment catalyst (No. 15).

Example 16

Catalyst Preparation Method 16

A titania honeycomb catalyst (pitch: 7.4 mm, wall thickness: 1.15 mm) serving as a substrate was immersed in the slurry (No. 10) prepared through Catalyst preparation method 10, whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 16).

Example 17

Catalyst Preparation Method 17

A titania honeycomb catalyst (pitch: 7.4 mm, wall thickness: 1.15 mm) serving as a substrate was immersed in the slurry (No. 13) prepared through Catalyst preparation method 13, whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 17).

Example 18

Catalyst Preparation Method 18

A titania honeycomb catalyst (pitch: 7.4 mm, wall thickness: 1.15 mm) serving as a substrate was immersed in the slurry (No. 14) prepared through Catalyst preparation method 14, whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 18).

Example 19

Catalyst Preparation Method 19

A titania honeycomb catalyst (pitch: 7.4 mm, wall thickness: 1.15 mm) serving as a substrate was immersed in the slurry (No. 15) prepared through Catalyst preparation method 15, whereby 100 g of the slurry was applied to a 1 $m^2$-surface area of the substrate. The catalyst was dried and, subsequently, fired at 500° C. for five hours.

The thus-fired honeycomb catalyst was provided as a discharge gas treatment catalyst (No. 19).

Comparative Example 1

Comparative Catalyst Preparation Method 1

An anatase-form titania powder ($TiO_2$) was mixed with a ruthenium chloride ($RuCl_3$) solution, to thereby prepare a slurry. Through spray drying of the slurry, Ru (1 part) was carried by the anatase-form titania powder (100 parts). Subsequently, the titania-silica-tungsten oxide powder was fired at 500° C. for five hours.

The thus-fired titania-ruthenium catalyst powder was mixed with water and pulverized by use of a wet ball mill, to thereby provide a slurry (Comparative No. 1) for catalyst coating.

A titania-tungsten oxide honeycomb catalyst (pitch: 7.4 mm, wall thickness: 1.15 mm) serving as a substrate was immersed in the above slurry (Comparative No. 1), whereby 100 g of the slurry was applied to a 1 $m^2$-surface area of the substrate. The catalyst was dried and, subsequently, fired at 500° C. for five hours.

The thus-fired honeycomb catalyst was provided as a comparative discharge gas treatment catalyst (No. 1).

Comparative Example 2

Comparative Catalyst Preparation Method 2

A honeycomb catalyst formed of 100 parts of titania ($TiO_2$) and 9 parts of tungsten oxide ($WO_3$) was immersed in a ruthenium chloride ($RuCl_3$) solution. Through impregnation caused by immersion, Ru (1 part) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (Comparative No. 2) for catalyst coating.

Subsequently, another honeycomb catalyst (pitch: 7.4 mm, wall thickness: 1.15 mm) serving as a substrate and formed of titania ($TiO_2$) (100 parts), tungsten oxide ($WO_3$) (9 parts), and vanadium pentoxide ($V_2O_5$) (0.6 parts) was immersed in the above slurry (Comparative No. 2), whereby 100 g of the slurry was applied to a 1 $m^2$-surface area of the honeycomb catalyst. The catalyst was dried and, subsequently, fired at 500° C. for five hours.

The thus-prepared honeycomb catalyst was provided as a comparative discharge gas treatment catalyst (No. 2).

Comparative Example 3

Comparative Catalyst Preparation Method 3

A honeycomb catalyst formed of 100 parts of titania ($TiO_2$) and 9 parts of tungsten oxide ($WO_3$) was immersed in a ruthenium chloride ($RuCl_3$) solution. Through impregnation caused by immersion, Ru (2 parts) was carried by the titania-tungsten oxide catalyst (100 parts). Subsequently, the titania-tungsten oxide catalyst carrying ruthenium was dried, followed by firing at 500° C. for five hours.

The thus-formed titania-tungsten oxide-ruthenium honeycomb catalyst was crushed by use of a crusher to a particle size of 10 mm or less. By use of a wet ball mill, the formed powder was further pulverized with water, to thereby prepare a slurry (Comparative No. 3) for catalyst coating.

Subsequently, another honeycomb catalyst (pitch: 7.4 mm, wall thickness: 1.15 mm) serving as a substrate and formed of titania ($TiO_2$) (100 parts) and tungsten oxide ($WO_3$) (9 parts) was immersed in the above slurry (Comparative No. 3), whereby 100 g of the slurry was applied to a 1 $m^2$-surface area of the honeycomb catalyst. The catalyst was dried and, subsequently, fired at 500° C. for five hours.

The thus-prepared honeycomb catalyst was provided as a comparative discharge gas treatment catalyst (No. 3).

Evaluation Experiments

Determination of Solid Acid Content

Solid acid content of each of $TiO_2$—$SiO_2$ complex oxide powders (Nos. 1 to 3) and the titania-tungsten oxide honeycomb catalysts thereof were determined through the temperature programmed pyridine desorption method.

Specifically, each prepared catalyst carrier (25 mg) was mixed with an equiamount of quartz powder, and the mixture was immobilized in a quartz tube (inner diameter: 4 mm) by use of kaolin wool. The quartz tube was placed in an electric furnace included in an FID gas chromatograph and was treated under helium (He) flow (45 mL/min) at 450° C. for 30 minutes. Subsequently, while the electric furnace was maintained at 150° C., pyridine (0.5 μL) was injected four to six times until pulse saturation was attained, whereby pyridine was caused to be adsorbed by the carrier. Then, the inside temperature of the electric furnace was elevated at 30° C./min, and desorbed pyridine was quantitated through FID gas chromatography. Solid acid content of each carrier was determined from a peak value of the TPD spectrum. Table 4 shows the results.

Determination of $SO_3$ Reduction Performance and $NO_x$ Removal Performance

Each of the aforementioned discharge gas treatment catalysts (Nos. 1 to 9) and comparative discharge gas treatment catalysts (Nos. 1 and 2) was shaped into a catalyst having a form shown in Table 1; i.e., 45.55 mm (equivalent to 6 conduits)×45.55 mm (equivalent to 6 conduits)×567 mm (length). Two catalysts which were thus-formed were linked in series, to thereby provide a test catalyst. A discharge gas was caused to pass through each test catalyst under the conditions shown in Table 1. Percent $SO_3$ reduction and $NO_x$ removal performance were determined at the first catalyst outlet (AV=42.8($m^3N/m^2·h$)) and the second catalyst outlet (AV=21.4($m^3N/m^2·h$)). In Table 1, "Ugs" denotes superficial velocity (flow rate of fluid/flow path cross-section area) and "AV" denotes area velocity (gas amount/total gas-contact area of catalyst).

TABLE 1

| | |
|---|---|
| Catalyst form | 45.55 mm (6 conduits) × 45.55 mm (6 conduits) × 567 mm length × 2 |
| Gas flow | 21.87 $m^3N/h$ |
| Ugs | 3.0 mN/sec |
| AV | 42.8 $m^3N/m^2$ · h (1st catalyst outlet) |
| | 21.4 $m^3N/m^2$ · h (2nd catalyst outlet) |
| Gas temperature | 380° C. |
| Gas composition | $NO_x$: 350 ppm |
| | $NH_3$: 420 ppm |
| | $SO_x$: 1,500 ppm |
| | $SO_3$: 30 ppm |
| | $O_2$: 3.5% |
| | $CO_2$: about 14% |
| | $H_2O$: about 13% |
| | $N_2$: balance |

In another test, each of the aforementioned discharge gas treatment catalysts (Nos. 10 to 19) and comparative discharge gas treatment catalyst (No. 3) was shaped into a catalyst having a form shown in Table 2; i.e., 45.55 mm (equivalent to 6 conduits)×45.55 mm (equivalent to 6 conduits)×462 mm (length). Three catalysts which were thus-formed were linked in series, to thereby provide a test catalyst. A discharge gas was caused to pass through each test catalyst under the conditions shown in Table 2. Percent $SO_3$ reduction and $NO_x$ removal performance were determined at the first catalyst outlet (AV=52.2($m^3N/m^2·h$)), the second catalyst outlet (AV=26.1($m^3N/m^2·h$)), and the third catalyst outlet (AV=17.4 ($m^3N/m^2·h$)). In Table 2, "Ugs" denotes superficial velocity (flow rate of fluid/flow path cross-section area) and "AV" denotes area velocity (gas amount/total gas-contact area of catalyst).

TABLE 2

| | |
|---|---|
| Catalyst form | 45.55 mm (6 conduits) × 45.55 mm (6 conduits) × 465 mm length × 3 |
| Gas flow | 21.87 $m^3N/h$ |
| Ugs | 3.0 mN/sec |
| AV | 52.2 $m^3N/m^2$ · h (1st catalyst outlet) |
| | 26.1 $m^3N/m^2$ · h (2nd catalyst outlet) |
| | 17.4 $m^3N/m^2$ · h (3rd catalyst outlet) |
| Gas temperature | 380° C. |
| Gas composition | $NO_x$: 350 ppm |
| | $NH_3$: 420 ppm |
| | $SO_x$: 1,500 ppm |
| | $SO_3$: 30 ppm |
| | $O_2$: 3.5% |
| | $CO_2$: about 14% |
| | $H_2O$: about 13% |
| | $N_2$: balance |

The determination results in relation to Table 1 are shown in Table 3, and those in relation to Table 2 are shown in Table 4.

In Table 3 and 4, percent $SO_3$ reduction and percent $NO_x$ removal are represented by the following formulas, respectively.

Percent $SO_3$ reduction (%)=[1−(outlet $SO_3$ concentration/inlet $SO_3$ concentration)]×100

Percent $NO_x$ removal (%)=[1−(outlet $NO_x$ concentration/inlet $NO_x$ concentration)]×100

TABLE 3

| Catalysts | | Carrier | Ru amount* [wt. ratio] | Coating amount (g/m²) | Substrate | Av = 42.8 (1st catalyst outlet) % SO₃ reduction (%) | Av = 42.8 (1st catalyst outlet) % NOₓ removal (%) | Av = 21.4 (2nd catalyst outlet) % SO₃ reduction (%) | Av = 21.4 (2nd catalyst outlet) % NOₓ removal (%) |
|---|---|---|---|---|---|---|---|---|---|
| Discharge gas treatment catalyst | 1 | TiO₂:WO₃ = 100:9 | 1 | 100 | TiO₂:WO₃ = 100:9 | 13.3 | 59.6 | 20.4 | 83.6 |
| | 2 | TiO₂:WO₃ = 100:9 | 1 | 200 | TiO₂:WO₃ = 100:9 | 14.0 | 59.1 | 24.1 | 83.7 |
| | 3 | TiO₂:WO₃ = 100:20 | 1 | 100 | TiO₂:WO₃ = 100:9 | 7.5 | 59.0 | 16.2 | 84.3 |
| | 4 | TiO₂:WO₃ = 100:9 | 2 | 100 | TiO₂:WO₃ = 100:9 | 21.1 | 61.2 | 22.7 | 83.4 |
| | 5 | TiO₂:WO₃ = 100:9 | 1 | 100 | TiO₂:WO₃ = 100:9 | 13.0 | 59.2 | 20.4 | 84.0 |
| | 6 | TiO₂:WO₃ = 100:9 | 0.1 | 100 | TiO₂:WO₃ = 100:9 | 5.4 | 59.3 | 5.8 | 82.9 |
| | 7 | TiO₂:WO₃ = 100:9 | 0.5 | 100 | TiO₂:WO₃ = 100:9 | 7.2 | 59.9 | 10.1 | 83.6 |
| | 8 | TiO₂:WO₃ = 100:9 | 4 | 100 | TiO₂:WO₃ = 100:9 | 22.0 | 64.2 | 21.5 | 82.9 |
| | 9 | TiO₂:WO₃ = 100:9 | 10 | 100 | TiO₂:WO₃ = 100:9 | 24.1 | 64.4 | 17.2 | 83.3 |
| Comparative discharge gas treatment catalyst | 1 | TiO₂ | 1 | 100 | TiO₂:WO₃ = 100:9 | 6.0 | 51.0 | 11.8 | 79.0 |
| | 2 | TiO₂:WO₃ = 100:9 | 1 | 100 | TiO₂:WO₃:V₂O₅ = 100:9:0.6 | 10.2 | 59.8 | 0.3 | 81.8 |

*Weight-base ratio with respect to 100 parts of carrier

TABLE 4

| Catalysts | | Carrier | Solid acid (mmol/g) | Ru amount* [wt. ratio] | Substrate | Av = 52.2 (1st catalyst outlet) % SO₃ reduction (%) | Av = 52.2 (1st catalyst outlet) % NOₓ removal (%) | Av = 26.1 (2nd catalyst outlet) % SO₃ reduction (%) | Av = 26.1 (2nd catalyst outlet) % NOₓ removal (%) | Av = 17.4 (3rd catalyst outlet) % SO₃ reduction (%) | Av = 17.4 (3rd catalyst outlet) % NOₓ removal (%) |
|---|---|---|---|---|---|---|---|---|---|---|---|
| Discharge gas treatment catalyst | 10 | TiO₂:SiO₂ = 95:5 | 0.55 | 2 | TiO₂:WO₃ = 100:9 | 5.0 | 48.5 | 8.0 | 78.0 | 4.5 | 89.0 |
| | 11 | TiO₂:SiO₂ = 90:10 | 0.47 | 2 | TiO₂:WO₃ = 100:9 | 4.8 | 48.5 | 7.5 | 79.0 | 4.3 | 88.5 |
| | 12 | TiO₂:SiO₂ = 80:20 | 0.33 | 2 | TiO₂:WO₃ = 100:9 | 4.5 | 48.0 | 7.0 | 80.0 | 4.0 | 88.5 |
| | 13 | TiO₂:SiO₂ = 95:5 | 0.55 | 4 | TiO₂:WO₃ = 100:9 | 11.0 | 50.3 | 17.5 | 80.5 | 17.3 | 91.8 |
| | 14 | (TiO₂—SiO₂):WO₃ = 100:9 | — | 2 | TiO₂:WO₃ = 100:9 | 10.5 | 56.5 | 17.3 | 85.5 | 24.3 | 95.5 |
| | 15 | (TiO₂—SiO₂):WO₃ = 100:9 | — | 4 | TiO₂:WO₃ = 100:9 | 18.5 | 58.5 | 26.0 | 86.5 | 11.5 | 94.0 |
| | 16 | TiO₂:SiO₂ = 95:5 | 0.55 | 2 | TiO₂ | 5.2 | 49.4 | 8.0 | 78.7 | 4.9 | 90.8 |
| | 17 | TiO₂:SiO₂ = 95:5 | 0.55 | 4 | TiO₂ | 11.0 | 50.8 | 18.2 | 80.8 | 18.1 | 91.9 |
| | 18 | (TiO₂—SiO₂):WO₃ = 100:9 | — | 2 | TiO₂ | 11.2 | 57.0 | 17.7 | 85.6 | 24.8 | 96.2 |
| | 19 | (TiO₂—SiO₂):WO₃ = 100:9 | — | 4 | TiO₂ | 19.2 | 59.3 | 26.6 | 87.1 | 11.7 | 94.5 |
| Comparative discharge gas treatment catalyst | 3 | TiO₂:WO₃ = 100:9 | 0.28 | 2 | TiO₂:WO₃ = 100:9 | 21.1 | 61.2 | 22.7 | 83.4 | 2.5 | 88.9 |

*Weight-base ratio with respect to 100 parts of carrier

As is clear from Tables 3 and 4, the discharge gas treatment catalyst of the present invention exhibits SO₃ reduction performance and NOₓ removal performance. The determination results of discharge gas treatment catalysts (Nos. 1 and 2) indicate that percent SO₃ reduction is enhanced by increasing the amount of carrier applied to the substrate and contact area between discharge gas and the carrier. The determination results of discharge gas treatment catalysts (Nos. 1, 4, and 6 to 9) indicate that percent SO₃ reduction is enhanced by increasing the amount of Ru with respect to 100 parts of carrier and contact area between discharge gas and the carrier.

The determination results of discharge gas treatment catalysts (Nos. 1 to 9) and comparative discharge gas treatment catalyst (No. 1) indicate that percent SO₃ reduction and percent NOₓ removal are enhanced in the case where a titania-tungsten oxide carrier is used, as compared with the case where a titania carrier is employed.

The determination results of discharge gas treatment catalyst (No. 1) and comparative discharge gas treatment catalyst (No. 2) indicate that percent SO₃ reduction and percent NOₓ removal are enhanced in the case where a titania-tungsten oxide substrate is used, as compared with the case where a titania-tungsten oxide-vanadium oxide substrate is employed.

The determination results of discharge gas treatment catalysts (Nos. 10 to 13, 16, and 17) indicate that an Ru-on-carrier (TiO₂—SiO₂ complex oxide) catalyst exhibits SO₃ reduction performance and NOₓ removal performance. The determination results of discharge gas treatment catalysts (Nos. 14, 15, 18, and 19) indicate that percent SO₃ reduction and percent NOₓ removal are enhanced through employment of a TiO₂—SiO₂ complex oxide carrier that carries WO₃.

The determination results of discharge gas treatment catalysts (Nos. 8 and 9) indicate that percent SO₃ reduction at the first catalyst outlet exceeds that at the second catalyst outlet, when the Ru amount is 4 parts or more with respect to 100 parts of carrier.

One conceivable reason for this is that increasing Ru amount induces side reaction ($NH_3$ decomposition) as shown in scheme (5), decreasing $NH_3$ serving as a reducing agent.

$$4NH_3 + 3O_2 \rightarrow 2N_2 + 6H_2O \qquad (5)$$

The performance test results of discharge gas treatment catalysts (Nos. 10 to 12) and those of comparative discharge gas treatment catalyst (No. 3) were compared. In an area where area velocity (AV) is high (i.e., small catalyst amount), comparative discharge gas treatment catalyst (No. 3) exhibits higher $SO_3$ reduction performance and $NO_x$ removal performance. In contrast, in an area where area velocity (AV) is low (i.e., large catalyst amount), discharge gas treatment catalysts (Nos. 10 to 12) exhibit higher $SO_3$ reduction performance and $NO_x$ removal performance.

One conceivable reason for this is as follows. When the solid acid content of the carrier is small, $NH_3$ adsorption performance decreases, and side reaction ($NH_3$ decomposition) predominates, thereby decreasing $NH_3$ serving as a reducing agent as shown in Scheme (5). In other words, when the solid acid content is large, the carrier strongly adsorbs $NH_3$, thereby suppressing side reaction ($NH_3$ decomposition) and increasing concentration of $NH_3$ which reduces $SO_3$.

Thus, percent $SO_3$ reduction and percent $NO_3$ removal of the discharge gas treatment catalysts were found to depend upon the type and solid acid content of the carrier of the discharge gas treatment catalysts; concentration of ruthenium carried by the carrier; contact area between ruthenium carried by the carrier of the discharge gas treatment catalyst and discharge gas; and amount of ammonia added to the discharge gas.

According to the present invention, reduction reactions of sulfur trioxide and nitrogen oxides contained in discharge gas are promoted, thereby decreasing $SO_x$ concentration and $NO_x$ concentration. In addition, size and cost of discharge gas treatment apparatus can be reduced.

According to the present invention $SO_x$ concentration and $NO_x$ concentration of discharge gas can be decreased. Thus, the invention is suitable for treatment of a discharge gas which is produced from a boiler where heavy oil, coal, etc. having a high sulfur content is combusted as fuel.

What is claimed is:

1. A discharge gas treatment catalyst for removing nitrogen oxide and sulfur trioxide from a discharge gas, consisting essentially of:
    a carrier which is formed of titania-tungsten oxide, titania-silica, or titania-silica-tungsten oxide, and which carries ruthenium; and
    a substrate which is coated with the carrier carrying ruthenium.

2. A discharge gas treatment catalyst as described in claim 1, wherein, when the carrier is titania-tungsten oxide, the carrier contains tungsten oxide in an amount of 0.1 to 25 parts by weight on the basis of 100 parts by weight of titania contained in the carrier.

3. A discharge gas treatment catalyst as described in claim 1, wherein, when the carrier is titania-silica or titaniasilica-tungsten oxide, the carrier has a solid acid content of 0.3 mmol/g or higher.

4. A discharge gas treatment catalyst as described in claim 1, which contains ruthenium in an amount of 0.02 to 10 parts by weight on the basis of 100 parts by weight of the carrier.

* * * * *